Jan. 31, 1967   W. E. KOEBLITZ ET AL   3,302,212
MAGNETIC RECORDER DEVICE

Filed Nov. 9, 1964

INVENTORS
WILLIAM E. KOEBLITZ
ALLAN R. THOMPSON
BY

ATTORNEY

INVENTORS
WILLIAM E. KOEBLITZ
ALLAN R. THOMPSON
BY
*Elver J. Hyde*
ATTORNEY

3,302,212
MAGNETIC RECORDER DEVICE
William E. Koeblitz, Lyndhurst, and Allan R. Thompson, Westlake, Ohio, assignors to Clevite Corporation, a corporation of Ohio
Filed Nov. 9, 1964, Ser. No. 409,699
13 Claims. (Cl. 346—139)

This invention pertains to a magnetic recorder device such as a pen or stylus recorder for recording electric signals. More particularly the invention pertains to a novel circuit for stabilizing or damping the drive system, and also pertains to a novel control to compensate for temperature changes induced by ambient conditions or by applying to the system electric signals of high frequency and/or high amplitude.

Reference should be made to the circuit shown in FIGURE 13 of United States Patent No. 3,088,788, issued on May 7, 1963 to Arling Dix Brown, Jr., and Chester L. Morris, and assigned to the same assignee as the present invention.

The present invention is an improvement on the circuit shown in the aforesaid patent in the following respects:

The present invention eliminates the velocity coil thereby reducing the mass which had to be driven and obviating the necessity of winding a double coil. Further, and even more important, there was transformer coupling between the drive coil and the velocity coil, thereby introducing signals which had to be bucked out by means of a stationary bucking coil.

The bucking coil introduced difficulties when several recorder devices were mounted closely adjacent each other in a multichannel device, because the bucking coils picked up signals from adjacent channels which were not bucking signals.

The present system, by eliminating the velocity coil and its difficulties, also eliminates the bucking coil and its difficulties.

The present invention is an improvement over the previous device in that it is substantially insensitive to temperature changes, either ambient or due to an increase in the temperature of the drive coil as a reuslt of driving it hard.

It is, therefore an object of the present invention to provide a magnetic recorder device the stabilization of which is independent of extra coils.

It is another object of the present invention to provide a stabilized magnetic recorder instrument which is substantially insensitive to ambient and operational temperature changes.

For a better understanding of the present invention, together with other and further objects thereof, reference is made to the following description taken in connection with the accompanying drawings, and its scope will be pointed out in the appended claims.

An aspect of the present invention lies in the provision of a magnetic recorder device such as a pen recorder, wherein there is a magnet system having an air gap within which a rotatable driving coil is mounted. The recording device is driven by the coil to record electric signals on a moving record chart. An input electric circuit is connected to thte driving coil and thermistor means are located in or near the coil so as to be at substantially the same temperature as the coil. The thermistor means is connected to the electric circuit means to change the output therefrom to the driving coil to compensate for changes due to temperature changes of the driving coil.

Another aspect of the invention involves a magnetic recorder device with a magnet system and a coil rotatably mounted therein and a recording device driven by the coil. Electric circuit means are connected to the coil and include a differential error amplifier into which the signal to be recorded is connected. Position sensing means are connected to the recording device to sense its position as it moves and they are electrically connected to the input of the amplifier to apply thereto an electric signal proportional to the position of the recording device. Position and velocity means are connected between the position sensing means and the amplifier for differentiating the signal and for applying to the input of said amplifier the differentiated signal.

Figure 1:
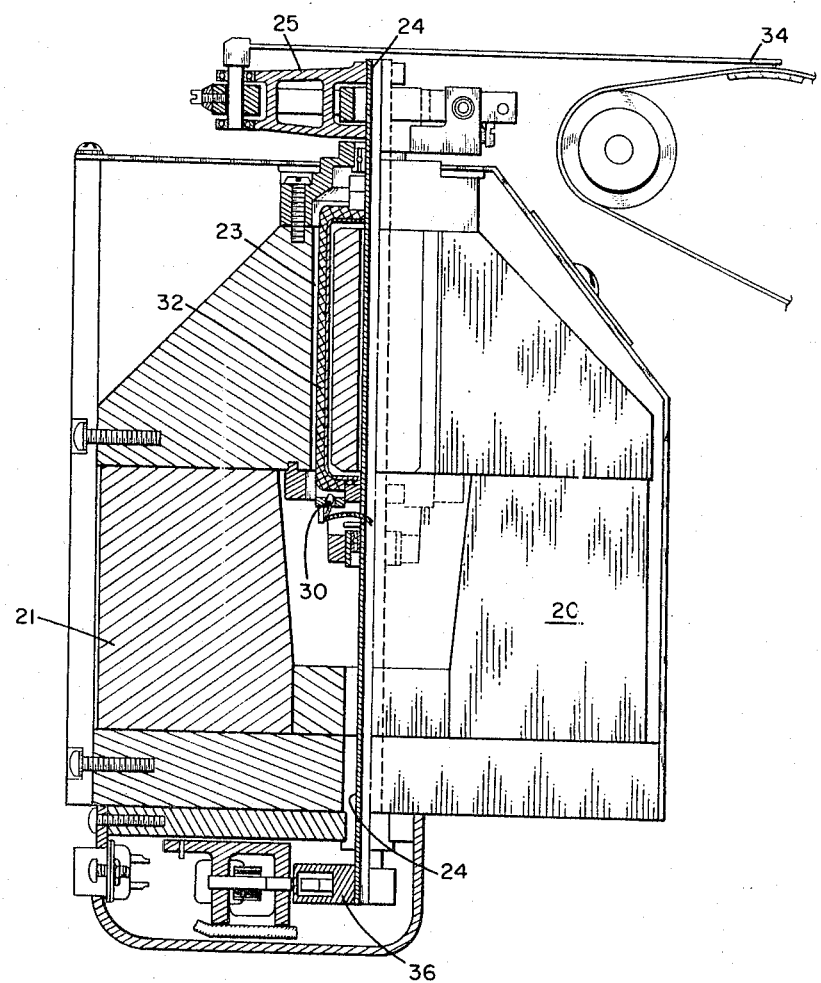
FIGURE 1 is a view, partially in cross-section, showing a magnetic recorder device.
Figure 2:
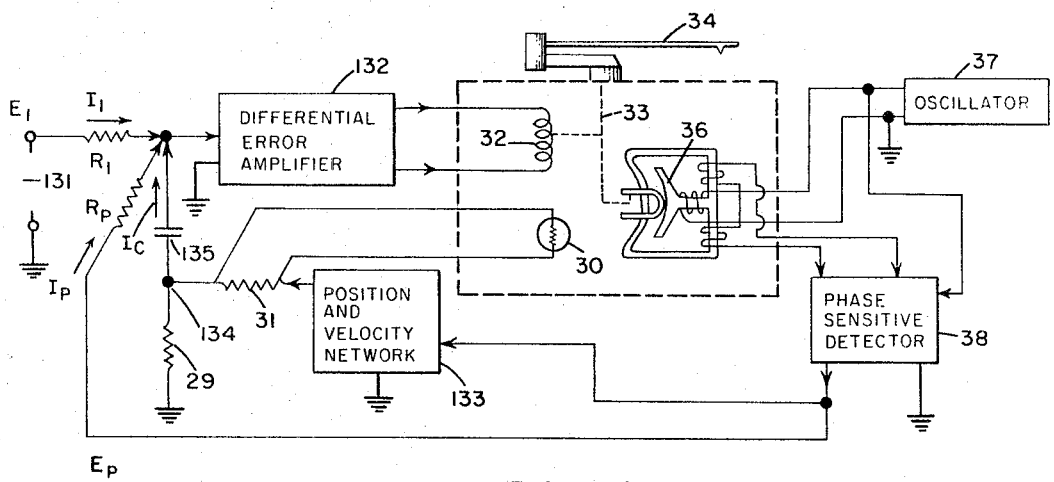
FIGURE 2 is a schematic circuit diagram showing the features of the present invention.

With reference to FIGURE 1 of the drawing there is shown a magnetic recorder device 20 which includes a magnet system 21 having an air gap 23. In the gap 23 there is rotatably mounted a drive coil 32. The drive coil is connected to a drive shaft 24 which rotates a mechanism 25 which converts the rotary motion into a rectilinear motion and drives a pen recorder device 34, as is explained in detail in the aforesaid patent. The drive shaft 24 also operates a position sensing mechanism 36.

Within the recorder mechanism there is positioned a thermistor 30. This is located closely adjacent to the drive coil 32 so that it is at the same temperature as the coil, and so that as the temperature of the coil changes the temperature of the thermistor will change.

The details of the position sensing means 36 and its oscillator 37 and phase sensitive detector 38 are not part of this invention. Preferably, this transducer is of the general type disclosed in U.S. Patent 3,088,788 issued to Brown et al. Referring to FIGURE 14 of Brown et al., the transducer compries a laminated magnetic core 136 having opposite end legs 137 and 138, a back leg 139 interconnecting the end legs, an arcuate front leg 140 interconnecting the end legs, and a center leg 141 which extends from the back leg and terminates in an arcuate enlargement 142 extending in close-spaced, parallel relationship to the inside face of the front leg 140.

An input coil 143 is wound on the center leg 141 of the core. As shown in FIGURE 13 of Brown et al., this input coil is connected to be energized by an oscillator 144.

A pair of series-connected output coils 145 and 146 are wound on the back leg of the core on opposite sides of the center leg. These output coils are connected in series opposition with each other across the input terminals of a phase sensitive detector 147 (FIG. 13 of Brown et al.). Oscillator 144 provides another input signal to the detector 147. The output of this detector 147, which is a voltage proportional to the position of the pen, is applied to the "position voltage" input terminal of the summing and shaping network 134.

The transducer T also includes a movable armature member 75 which is connected to the coil shaft 33. This armature member is a single loop of electrically conductive material and is made up of laterally spaced legs 148 and 149 (FIG. 15 of Brown et al.) which are bifurcated at their front ends to straddle the front leg 140 of the transducer core. A bridging segment 150 joined to these legs at their front ends is disposed in the air gap between the confronting faces of the core portions 142 and 140.

When the armature 75 is positioned in alignment with the axis of the center core leg 141, the flux induced in the center leg by the A.C. voltage applied to coil 143 divides equally between the two end legs 137 and 138 of the core and produces equal and opposite voltages in the coils 145 and 146. Under this condition therefore, the net output voltage from the position transducer T is zero. This is the condition which is obtained when the drive coil 32 is in its centered position.

When the armature 75 is displaced away from this centered position, the flux divides unequally between the end legs 137 and 138 of the core. The amplitude of the resulting output voltage from transducer T varies linearly with the amount of angular displacement of the armature 75 from its centered position. In the phase sensitive detector 147, the transducer voltage is compared with the input voltage from oscillator 144 to determine the sign or polarity of the "position voltage," depending upon the direction in which the armature has been moved from its centered position.

The "position voltage" output signal from the phase sensitive detector 147 has a magnitude which depends upon the angular displacement of the armature 75 from its centered position. Since armature 75 moves angularly in unison with the drive coil 32, the "position voltage" varies as a straight line function of the angular displacement of drive coil 32 from its neutral position.

The lateral displacement of the recording tip 34a from its zero position is a function expressed exactly by Equation 3 of Brown et al., which is almost a straight line function of the angular displacement of the drive coil 32. However, its deviation from an exactly straight line relationship increases as the displacement increases. This error is compensated by proper design of the feedback transducer T and phase sensitive detector 147. Thus, as the magnitude of the "position voltage" increases the network 134 produces an output signal to the amplifier 132 which is a linear function of the pen movement. The net result is that the pen tip is caused to have a lateral displacement which is precisely linearly proportional to the input signal which is being recorded.

A feedback system such as this requires stabilization to prevent it from oscillating. Mathematics of the system show that by introducing velocity feedback only the system should have perfect response. However, as a practical matter, small imperfections require the introduction of some acceleration feedback to achieve the degree of quality required in today's highly accurate pen or stylus operated oscillographs.

From the position sensing means 36 there is obtained a position signal which is proportional to the position of the recording means 34. This signal is connected through resistor $R_p$ to the input of a differential error amplifier 132. The signal to be recorded by the recording means 34 is obtained from the input 131 and is also connected into the amplifier 132. The position signal from the position sensing means 36 is also applied to a position and velocity network 133, the details of which are shown and described in connection with FIGURE 3. The position and velocity network 133 passes part of the signal and differentiates part of the signal so that its output signal at point 134 is proportional to velocity and position, and it is connected through capacitor 135 to the input of amplifier 132. The capacitor 135 again differentiates the signal so that the signal fed into amplifier 132 is proportional to acceleration and velocity.

The error amplifier 132 acts to make the input current sum equal to zero, or $I_1 + I_p + I_c = 0$. During non-transient conditions when the recorder means 34 is stationary ($I_c = 0$), $I_1 = -I_p$, or $E_p = -(R_p/R_1)E_1$, showing that if $E_p$ is a linear function of actual pen position, the pen position will be linear with $E_1$.

Instead of using a velocity coil as was done in the circuit of Patent 3,088,788, a velocity signal is obtained at point 134 by differentiating part of the position signal in the network 133. The current $I_c$ is represented by $CdE_c/dt$. If $E_c$ is proportional to position, $$E_c = \text{constant} \times \text{position and}$$

$$dE_c/dt = \text{constant} \times d/dt \text{ (position) and}$$

$$I_c = \text{constant} \times \text{velocity}$$

Out of the network 133 a signal is derived which is representative of both velocity and position, so that $$E_c = K_1(\text{position}) + K_2 \times (\text{velocity})$$

where $K_1$ and $K_2$ are damping adjustments. Then the signal $I_c$ applied to the amplifier 132 becomes $$CdE_c/dt = CK_1 d/dt(\text{position}) + CK_2 d/dt(\text{velocity})$$

or $$I_c = CK_1(\text{velocity}) + CK_2(\text{acceleration})$$

One of the features of the present invention is a thermistor 30 embedded in the drive coil 32 so that it is at the same temperature as the coil 32. Thermistor 30 is connected across resistor 31 in the output from network 133. The magnitude of $E_c$ depends upon the ratio of the voltage divider formed by resistor 31, resistor 29 and the resistance of thermistor 30. Thus as coil 32 changes temperature due to ambient or operational temperature changes, so does the thermistor change. To compensate for the changes in damping due to the temperature change, both the velocity and the acceleration feedback are raised in the same proportion. The change in resistance of the thermistor is in an opposite sense to the change in the resistance of the coil 32 and is just enough to completely compensate for change of damping due to temperature changes.

Figure 3:
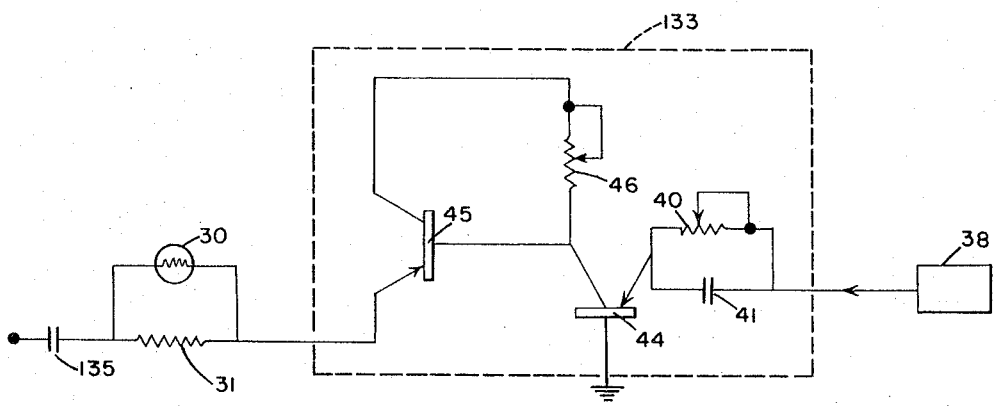
FIGURE 3 is a circuit diagram showing details of the position and velocity network.

FIGURE 3 shows the important aspects of the position and velocity network 133 and its relation to the thermistor and its input and output circuits.

Output from the phase sensitive detector 38 of the position sensing means 36 is a position signal. It is applied to a resistor-capacitor network 40, 41 which can be adjusted by changing the value of resistor 40 to change the ratio of position signal to velocity signal, and this eventually becomes the acceleration and velocity signals. The adjusted signal is applied to a first transistor 44 and then to a second transistor 45 through a second variable resistor 46. Changing the value of resistor 46 changes both the position and velocity signals which come out of the position and velocity network 133.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. In a magnetic recorder device, the combination of: a magnet system having an air gap; a driving coil rotatable in said air gap; a recording device driven by said driving coil; electric circuit means connected to said driving coil including a differential error amplifier, signal input means connected to said amplifier; position sensing means connected to said recording device to sense its position and electrically connected to the input of said amplifier to apply thereto an electric signal proportional to the position of said recording device; means connected between said position sensing means and said amplifier for differentiating the electric signal from said position sensing means and for applying said differentiated signal to the input of said amplifier; and heat sensing means located near said driving coil so as to be at substantially the same temperature as said driving coil; said heat sensing means being connected to the input of said amplifier means to change the output therefrom to said driving coil to compensate for changes due to temperature changes of said driving coil.

2. A magnetic recorder device as set forth in claim 1, further characterized by said heat sensing means comprising thermistor means heated by said driving coil as the temperature of said driving coil increases during operation.

3. In a magnetic recorder device, the combination of: a magnet system having an air gap; a driving coil rotatable in said air gap; a recording device driven by said driving coil; electric circuit means connected to said driving coil; position sensing means connected to said recording device to sense its position and electrically connected to said electric circuit means to apply thereto an electric signal proportional to the position of said recording device; and heat sensing means located near said driving coil so as to be at substantially the same temperature as said driving coil; said heat sensing means being connected to said electric circuit means to change the electric output therefrom to said driving coil to compensate for changes due to temperature changes of said driving coil.

4. In a magnetic recorder device, the combination of: a magnetic system having an air gap; a driving coil rotatable in said air gap; a recording device driven by said driving coil; electric circuit means connected to said driving coil including a differential error amplifier, signal input means connected to said amplifier; position sensing means connected to said recording device to sense its position and electrically connected to the input of said amplifier to apply thereto an electric signal proportional to the position of said recording device; means connected between said position sensing means and said amplifier for differentiating the electric signal from said position sensing means and for applying said differentiated signal to the input of said amplifier; and thermistor means located near said driving coil so as to be at substantially the same temperature as said driving coil; said thermistor means being connected to the input of said amplifier means to change the output therefrom to said driving coil to compensate for changes due to temperature changes of said driving coil.

5. A magnetic recorder device as set forth in claim 4, further characterized by: resistor means connected between said velocity means and said amplifier; said thermistor means being connected in parallel with said resistor means.

6. A magnetic recorder device as set forth in claim 4, further characterized by: acceleration means connected between said position and velocity means and said amplifier for further differentiating the electric signal from said position sensing means to obtain a velocity and acceleration signal and for applying said velocity and acceleration signal to said amplifier.

7. In a magnetic recorder device, the combination of: a magnetic system having an air gap; a driving coil rotatable in said air gap; a recording device driven by said driving coil; electric circuit means connected to said driving coil including a differential error amplifier; signal input means connected to said amplifier to cause said recorder means to record said input signal; position sensing means connected to said recording device to sense its position as it moves and electrically connected to the input of said amplifier to apply thereto an electric signal proportional to the position of said recording device; and position and velocity means connected between said position sensing means and said amplifier for differentiating the signal and for applying to the input of said amplifier said differentiated signal.

8. A magnetic recorder device as set forth in claim 7, further characterized by: said position sensing means producing a position signal proportional to the position of said recording device; and by said position and velocity means differentiating said position signal to obtain a velocity signal which is applied to the input of said amplifier.

9. A magnetic recorder as set forth in claim 8, further characterized by capacitor means connected between said position and velocity means and said amplifier to differentiate the signal output from said position and velocity means thereby to apply to the input of said amplifier a signal proportional to velocity and acceleration.

10. In a magnetic recorder device, the combination of: a magnetic system having an air gap; a driving coil rotatable in said air gap; a recording device driven by said driving coil; electric circuit means connected to said driving coil including a differential error amplifier; signal input means connected to said amplifier; position sensing means connected to said recording device to sense its position as it moves and to generate an electric position signal output; and circuit means connected to the electric output of said position sensing means and connected to the differential error amplifier for applying to said amplifier feedback signals proportional to position, velocity and acceleration.

11. A magnetic recorder device as set forth in claim 10, further characterized by thermistor means located near said driving coil so as to be at substantially the same temperature as said driving coil and connected to the amplifier, said thermistor means varying only the magnitude of the velocity and acceleration feedback signals in accordance with the temperature variation in said driving coil.

12. A magnetic recorder device as set forth in claim 10, further characterized by said circuit means for applying the feedback signals to said amplifier including a transistorized position and velocity network to differentiate said electric position signal.

13. A magnetic recorder device as set forth in claim 12, further characterized by said transistorized network comprising two transistors, means connected to one of said two transistors for changing the ratio of the acceleration to velocity signals; and means connected to the other transistor for changing the magnitude of both the acceleration and velocity signals.

References Cited by the Examiner

UNITED STATES PATENTS

| | | | |
|---|---|---|---|
| 2,350,835 | 6/1944 | Sias | 317—173 |
| 3,088,788 | 5/1963 | Brown et al. | 346—111 |

RICHARD B. WILKINSON, *Primary Examiner.*

JAMES G. MURRAY, *Assistant Examiner.*